United States Patent
Egozi-Levi et al.

(10) Patent No.: US 11,501,175 B2
(45) Date of Patent: Nov. 15, 2022

(54) GENERATING RECOMMENDED INPUTS

(71) Applicant: ENTIT SOFTWARE LLC, Sanford, NC (US)

(72) Inventors: Efrat Egozi-Levi, Yehud (IL); Ohad Assulin, Yehud (IL); Boaz Shor, Yehud (IL); Mor Gelberg, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 888 days.

(21) Appl. No.: 16/075,846

(22) PCT Filed: Feb. 8, 2016

(86) PCT No.: PCT/US2016/016948
§ 371 (c)(1),
(2) Date: Aug. 6, 2018

(87) PCT Pub. No.: WO2017/138910
PCT Pub. Date: Aug. 17, 2017

(65) Prior Publication Data
US 2019/0050739 A1 Feb. 14, 2019

(51) Int. Cl.
*G06F 16/248* (2019.01)
*G06N 5/02* (2006.01)
*G06Q 10/04* (2012.01)
*G06F 16/21* (2019.01)

(52) U.S. Cl.
CPC ............. *G06N 5/02* (2013.01); *G06F 16/219* (2019.01); *G06F 16/248* (2019.01); *G06Q 10/04* (2013.01)

(58) Field of Classification Search
CPC ......... G06N 5/02; G06Q 10/04; G06F 16/248
See application file for complete search history.

(56) References Cited

U.S. PATENT DOCUMENTS 6,005,978 A * 12/1999 Garakani ........... G06V 30/2504
382/199
6,408,109 B1 * 6/2002 Silver ....................... G06T 7/12
382/190

(Continued)

FOREIGN PATENT DOCUMENTS

WO WO-2013192246 A2 * 12/2013 ............. G06Q 10/06
WO WO2013192246 A2 12/2013

OTHER PUBLICATIONS

International Searching Authority., International Search Report and Written Opinion dated Nov. 7, 2016 for PCT Application No. PCT/US2016/016948 Field Feb. 8, 2016, 12 pages.

(Continued)

*Primary Examiner* — Phenuel S Salomon
(74) *Attorney, Agent, or Firm* — Sheridan Ross P.C.

(57) ABSTRACT

Example embodiments relate to generating sets of recommended inputs for changing predicted results of a predictive model. The examples disclosed herein access, from a database, a historical set of inputs and results of a predictive model. A function is approximated based on the historical set of inputs and results, and a gradient of the function is computed using a result of the function with respect to a local maximum value of the function. A set of recommended inputs is generated based on the gradient of the function, where a recommended input produces a positive result of the function.

20 Claims, 5 Drawing Sheets

(56) References Cited

U.S. PATENT DOCUMENTS

| | | | |
|---|---|---|---|
| 7,606,684 B1* | 10/2009 | Pierce | G06Q 10/04 |
| | | | 702/189 |
| 8,954,361 B1 | 2/2015 | Phillips et al. | |
| 9,098,810 B1 | 8/2015 | Sengupta et al. | |
| 2002/0143495 A1* | 10/2002 | Roser | G06F 17/18 |
| | | | 702/179 |
| 2003/0055523 A1* | 3/2003 | Bunkofske | G05B 23/0221 |
| | | | 700/108 |
| 2004/0153249 A1* | 8/2004 | Zhang | G16B 40/00 |
| | | | 702/19 |
| 2008/0162212 A1* | 7/2008 | Clayton | G06Q 99/00 |
| | | | 705/7.11 |
| 2010/0036794 A1 | 2/2010 | Yaginuma et al. | |
| 2010/0299509 A1* | 11/2010 | Doi | G06F 9/325 |
| | | | 712/241 |
| 2012/0136824 A1* | 5/2012 | Williamson | G06Q 99/00 |
| | | | 707/603 |
| 2012/0150576 A1* | 6/2012 | Wagenblatt | G06Q 30/0202 |
| | | | 705/7.12 |
| 2014/0101024 A1* | 4/2014 | Li | G06Q 40/025 |
| | | | 705/38 |
| 2014/0114709 A1* | 4/2014 | Olsen | G06Q 10/0631 |
| | | | 705/7.12 |
| 2015/0127589 A1 | 5/2015 | Lakshmanan et al. | |
| 2016/0071517 A1* | 3/2016 | Beaver | G10L 15/22 |
| | | | 704/9 |
| 2019/0030713 A1* | 1/2019 | Gabardos | B25J 9/1697 |

OTHER PUBLICATIONS

Zhang, Q, et al., Acute Ischemic Stroke Prediction from Physiological Time Series Patterns, Nov. 17, 2012, AIH 2012, pp. 45-54.

* cited by examiner

GENERATING RECOMMENDED INPUTS

BACKGROUND

Predictive modeling leverages statistics to predict outcomes of future, or otherwise unknown, events.

BRIEF DESCRIPTION OF THE DRAWINGS

The following detailed description references the drawings, wherein.

DETAILED DESCRIPTION

Predictive modeling, also known as predictive analytics, leverages statistics to predict outcomes of future, or otherwise unknown, events. Predictive modeling is used in various applicable fields, including in information technology, engineering, and numerous business practices. However, predicted outcomes of a predictive model alone may not be entirely practical or useful in advising actions to change a result. Existing solutions may not effectively produce recommendations to overturn an outcome. For example in the IT space, a prediction that a specific code-change will cause production issues or a prediction that a programming project will not converge on time is helpful, but it may not be informative as to how to change the predicted future outcome to the problem.

Generating suggestions based on undesired predictions may be challenging because there are many types of prediction models that cannot be easily visualized and understood. Current solutions tend to be highly complex with high dimensionality of data that hinder the efficient generation of recommendations to change the predicted outcome. Simply stated, determining changes to overturn an undesirable result of a predictive model may be much more challenging than mapping the predictive model itself.

Examples disclosed herein provide for generating recommended inputs that may be used to change a predicted result of a predictive model. For example, a computing device may access, from a database, a historical set of inputs and results of a predictive model. A function is approximated based on the historical set of inputs and results, and a gradient of the function is computed using a result of the function with respect to a local maximum value of the function. A set of recommended inputs is generated based on the gradient of the function, where a recommended input produces a positive result of the function. In this manner, examples herein may provide suggestions of what can be done in order to change the predicted result into a desired outcome.

Figure 1:
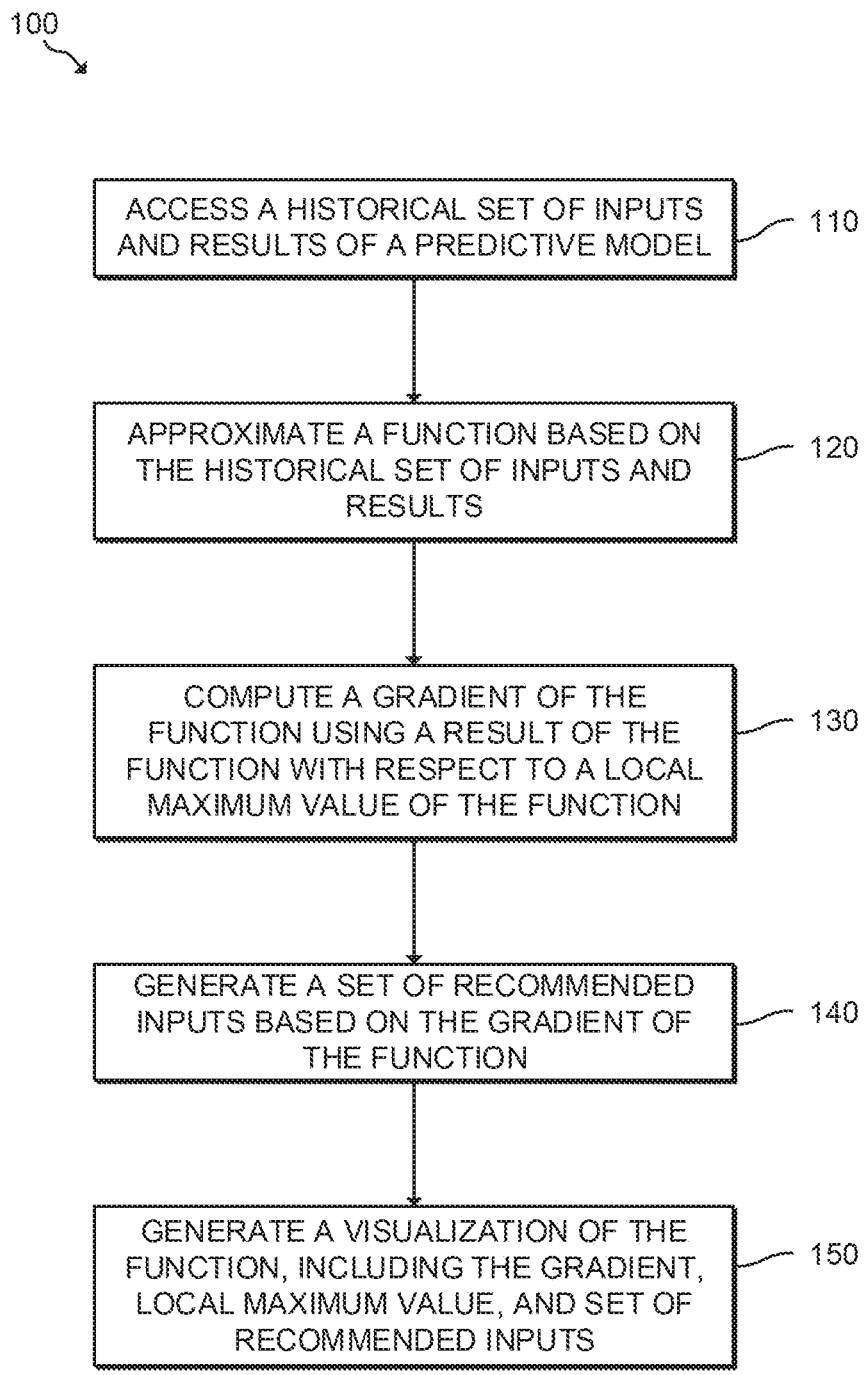
FIG. 1 is a flowchart of an example method for generating recommended inputs.

Referring now to the drawings, FIG. 1 depicts an example method 100 for generating recommended inputs for changing an outcome of a predictive model. Method 100 may be implemented in the form of executable instructions stored on a machine-readable storage medium and/or in the form of electronic circuitry. For example, method 100 may be executed by a processor of a computing device, such as a computing device 300 or 400 as described in detail in relation to FIGS. 3 and 4.

In an operation 110, a computing device may access a historical set of inputs and results of a predictive model from a database. As detailed subsequently herein, the computing device may be, for example, a server, a cloud server, a local area network server, a web server, a mainframe, a mobile computing device, a notebook or desktop computer, a point-of-sale device, a wearable device, any other suitable electronic device, or a combination of devices, such as ones connected by a cloud or internet network, that perform the functions described herein. For example, the computing device may execute the functions herein by the operation of a processor running instructions stored on a non-transitory machine-readable storage medium encoded with instructions. Or, for example, the computing device may have a series of engines, such as a combination of programming and circuity that may perform the functions described.

The computing device may access the historical set from any database or organized collection of data. For example, the historical information may be stored and accessed from a machine-readable storage medium, which may itself be a part of the computing device or accessed remotely such as via the cloud in a distributed database. In other examples, the historical set may not be previously stored in a database instead is actively entered into an active or temporary database.

The historical set of inputs and results of a predictive model may include input values and result values. For example, the input values may be variables and the result may be linked to the input values as a case in a set of labeled cases. The predictive model may be created by using the set of labeled cases, since each labeled case is a set of inputs and it corresponding result.

The historical set of inputs and results of a predictive model may represent various real-world examples. For instance, a real-world event may be caused by numerous identified factors. These factors may be considered the attributes that produced a corresponding result. For example, particular settings of individual devices in a computer network may produce a particular state of the network. Thus, the device settings are attributes corresponding to the particular result of the network. Similarly, the historical set of inputs and results may represent a plethora of applications, including in computing, industry, and business settings. For example, it may include successful and unsuccessful instances of a sales team or of an engineer performing product testing.

In some examples, the historical set of inputs and results of the predictive model may include the inputs corresponding to a positive or negative result. In other words, the results of the historical set may include a positive number, such as 1, and a negative number, such as −1, to represent a first or second result. For example, the numbers may respectively represent a successful and unsuccessful configuration of a computing network based on inputs such as network size and settings, or a successful or unsuccessful sale based on attributes such as bid price, negotiating time, and other factors.

Furthermore, in some examples, the historical set may also include a confidence value corresponding to each result of the predictive model. A corresponding confidence value may represent, for example, how many times a particular result occurs when the predictive model is applied to particular inputs. A confidence value may be represented by a percentage or decimal. For example, possible confidence values range from 0 to 1. As an illustration, a particular set of inputs of a computer network may result in a successful configuration of the network 78 out of 100 times. In such an instance, the confidence value of the inputs and result is 0.78.

In some examples, the historical set of inputs and results may be enriched by multiplying the results with corresponding confidence values. Thus, the enriched results may be represented by positive or negative numbers calibrated by their corresponding confidence values. Table 1 below illustrates an example historical set of inputs, results, confidence values, and resulting enriched results.

TABLE 1

| Inputs | Results | Confidence Value | Enriched Results |
|---|---|---|---|
| a, X | 1 | 1 | 1 |
| a, Y | 1 | .5 | 0.5 |
| a, Z | 1 | 0 | 0 |
| b, X | −1 | .2 | −0.2 |
| b, Y | 1 | .15 | 0.15 |
| b, Z | −1 | .75 | −0.75 |
| c, X | −1 | .3 | −0.3 |
| c, Y | 1 | .1 | 0.1 |
| c, Z | 1 | .33 | 0.33 |

In an operation 120, the computing device may approximate a function based on the historical set of inputs and results. The function may represent the historical set as a relation between the inputs or tuple of inputs and the results. For example a function F(inputs)=results. In some examples, a graph of the function may be generated for a lucid representation of the function.

Figure 3:
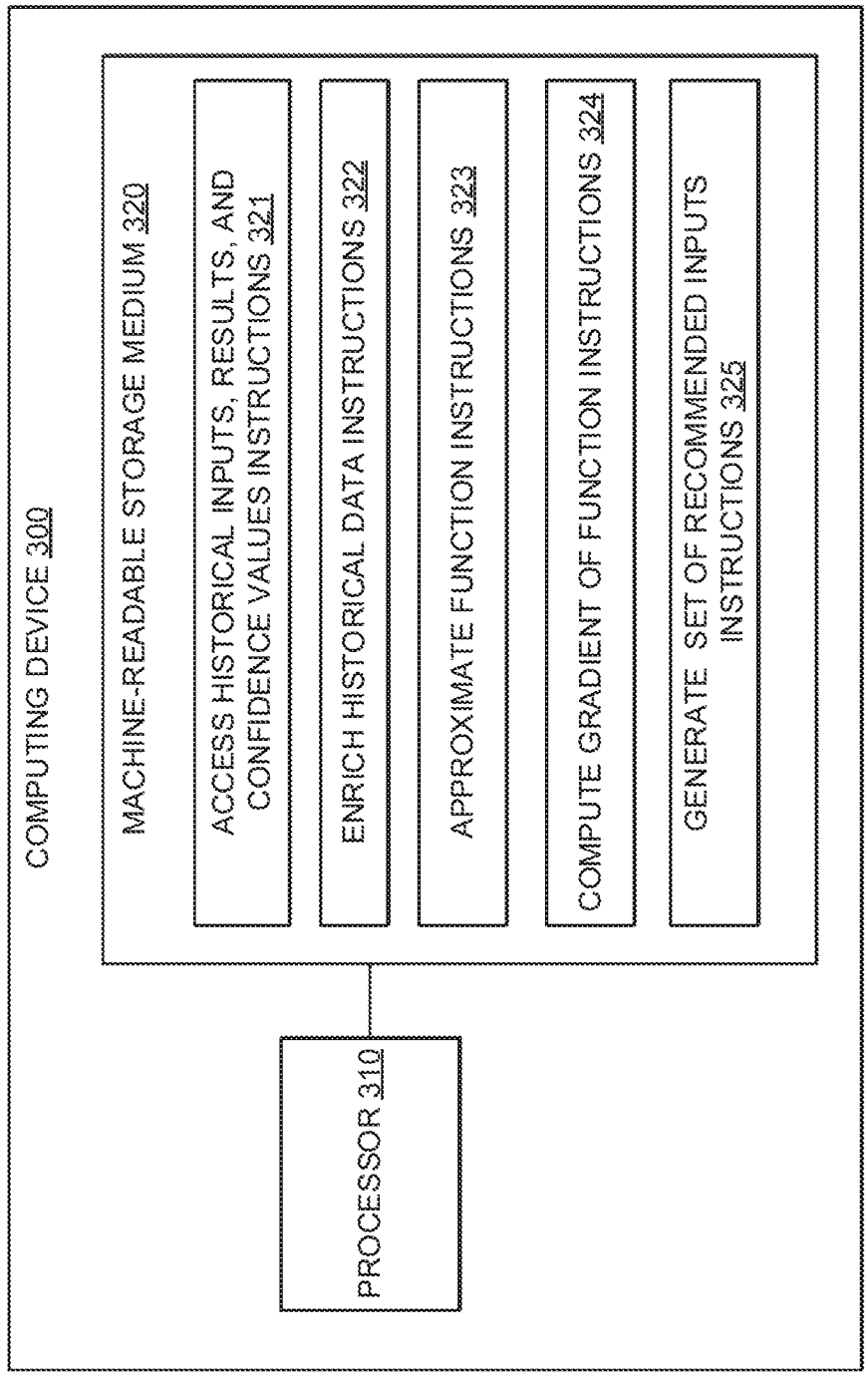
FIG. 3 is a block diagram of an example computing device for generating recommended inputs for changing an outcome of a predictive model.
Figure 5:
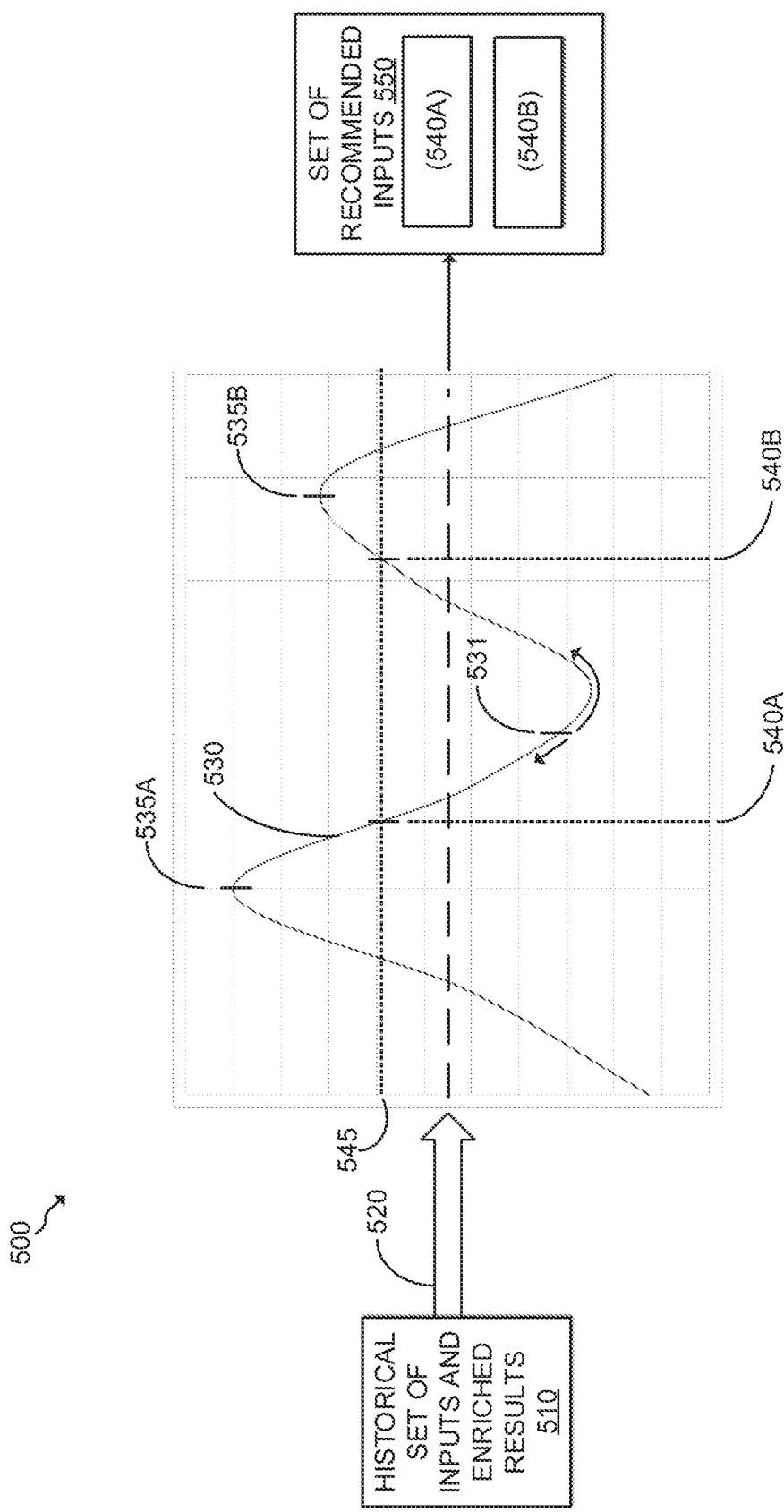
FIG. 5 is a schematic diagram of an example process of approximating a function using results of a predictive model.

As an illustration, FIG. 5 shows an example process 500 of approximating a function using a set of inputs and results of a predictive model. In the first step shown in FIG. 5, a historical set 510 of inputs and results, which may be enriched results, may be used to approximate a function 530. While function 530 of FIG. 3 illustrates an example with one set of inputs, as indicated in the x-axis, and results shown in the y-axis, function 530 is not confined to one variable and may be a multi-variable function reflecting various inputs of the predictive model.

A procedure 520 of approximating the function 530 based on historical set 510 may include any method or procedure that may best-fit a set of related input data and output data to a mathematical function or curve. For example, a function F may be approximated into the form y=F(inputs). Examples for approximating a function may include interpolation and smoothing. For example, a polynomial interpolation process may be performed to approximate a multivariable equation for the historical set 510. As a specific example, Multivariate Lagrange interpolation may be used in some cases.

As a separate operation or as part of operation 120, the computing device may, in some examples, reduce the function to three or fewer dimensions. For example, the computing device may perform dimensionality reduction algorithms and methods to reduce the number of variables under consideration. As examples, feature selection or feature extraction methods may be utilized. In some further cases, a combination of both types of methods may serve the purpose of the operation herein.

In some examples, the computing device may reduce the function using modifiable inputs of the historical set of inputs. For example, function F as used above may be reduced to a two-variable function, where the two variables are two modifiable inputs labeled or determined as modifiable. As an example, for the historical set of inputs and results described above relating to network configuration, the computing device may reduce the inputs under considerable to network capacity and network activity as related to a successful or unsuccessful configuration of the network. Network capacity and network activity may be attributes that may be modified by a network administrator for example.

Reducing the dimensionality of the function may allow the function to be comprehensibly represented by a two or three dimensional graph. For example, reducing a function to two dimensions—that is a function having one variable or input—allows the creating of a chart such as shown in FIG. 5. As another example, a function approximated by the two-variable data in table 1 above may be represented by a three-dimensional surface graph. Such a visual representation of the function may easily inform a user of the results for the function across a range of inputs. That is, the user may easily identify the predicted results and confidence values of the predictive model across a range of attributes.

In an operation 130, the computing device may compute a gradient of the function a result of the function with respect to a local maximum value of the function. While operation 130 will be described with reference to the example function 530 of FIG. 5, it should be understood that operation 130 is not limited to a two-dimensional graph of a function, but can be applied to any function produced in operation 120.

In the graph shown in FIG. 5 of the function 530, the function is shown to span both above and below the horizontal dashed axis. The horizontal dashed axis may represent the value zero in the vertical axis. For example, the vertical axis represents the enriched results of the predictive model that produced the historical set 510 of inputs and enhanced results. Accordingly, the function may produce y-axis values between −1 and 1.

Function 530 shows a graph having a local maximum 535A and a local maximum 535B. These local maxima points indicate peak enriched results values of the historical set 510. At a result 531 of the function, a gradient may be calculated with respect to local maximum 535A. In some examples, local 535B may also be used to calculate the gradient. However, because there are intervening value between result 531 and local maximum 535B, the gradient with respect to local maximum 535A may be more ideal for operation 130. In some other examples as described below, multiple local maxima may be used to calculate gradients for result 531.

The gradient calculated in operation 130 may represent the slope of the tangent of the graph of the function. Specifically, the gradient may point in the direction of the greatest rate of increase of the function. Therefore, the gradient may indicate the direction of the local maximum value. Knowing the gradient may allow the discovery of positive results of the function in the direction of the local maximum value.

In an operation 140, the computing device may generate a set of recommended inputs based on the gradient of the function. Each recommended input, when used in the function, may produce a positive result of the function. In other words, replacing an original input of the predictive model with a corresponding recommended input may generate a positive result of the predictive model.

In some examples, the set of recommended inputs may be generated by finding input values in the function that may produce a positive result. In some examples, a positive result may be defined as a result that is equal to or higher than a threshold result value. In the illustration in FIG. 5, result value 545 may represent the threshold result value. The computing device may identify the input value 540A that produces a result of the function that is equal to or higher than threshold result value 545. Accordingly, input value 540A may be added to the set of recommended inputs. In some examples, the threshold result value may be zero. In such instances, a recommended input may be an input value that produces any positive result—that is, a result above the dotted x-axis in FIG. 5.

Input value 540A may be identified by using the gradient of the function 530 at the result 531. Using the gradient to identify the direction of the local maximum 535A, the computing device may identify an input value that produces a result above the threshold. In some examples, the set of recommended inputs may be generated based on multiple gradients of the function. As described, multiple local maxima may be used to calculate multiple gradients. For example, local maximum 535A and local maximum 535B may be used to identify input value 540A in the direction of local maximum 535A and input value 540B in the direction of local maximum 535, where both input value 540A and input value 540B would produce a result of the function equal to or greater than the threshold result value 545. Thus, input values 540A and 540B may both be added to the set of recommended inputs.

To determine the recommended inputs, the computing device may, in some examples, execute an iterative gradient ascent approach. Gradient ascent may be a first-order optimization algorithm that takes steps proportional to the positive of the gradient in order to approach a local maximum of the function. The gradient ascent approach may facilitate identification of the steepest ascent to the local maximum.

The gradient ascent approach may be particularly useful when the function is multi-variable. In such cases, the gradient ascent approach may allow the identification of the steepest ascent towards the local maximum at each iterative step of the process. Thus, the gradient ascent finds the fastest way for a result of the function to get to the threshold result value as described herein, which is to say the fastest way to get to a recommended input.

When the function is calculated with a recommended input value, the function may produce a positive result. For example in table 1, input (b,X) produces a negative result. By keeping b the same and changing X to Y, input (b,Y) produces a positive result. Accordingly, the recommended input value may inform that the change from X to Y causes a positive result. In practices descriebd herein, the recommended input value may be some value between X and Y where the result of the function reaches a threshold result value.

Furthermore, in some examples, the set of recommended inputs may be prioritized based on the confidence values of the result of the predictive model for each recommended input value. The set of recommended inputs may include a plurality of inputs that produce a positive result of the function. The input values may be ranked, sorted, or otherwise distinguished by a corresponding confidence value of the result. In some examples, this may result in the input values being prioritized based on the magnitude of the result produced. Alternatively, in some examples, the set of recommended inputs may be prioritized by the relative magnitude of the local maximum based on which each recommended input was calculated. As described above, the magnitude of the enriched result of the function is related to both a positive and negative outcome of the predictive model and a confidence value of getting such a result.

In an operation 150, the computing device may generate a visualization of the function. The visualization may indicate the gradient, the local maximum value, and the set of recommended inputs. The visualization may provide a user with a visual representation of a predictive model as well as the set of recommended inputs that may change a result of the predictive model.

For example, the visualization may be illustrated as the two-dimensional graph shown in FIG. 5. The function 530 of FIG. 5 may be shown as a function of an input represented by the x-axis. The gradient represented by the arrows next to result 531 of the function indicates the direction towards local maxima values 535A and 535B. FIG. 5 also shows the input values 540A and 540B which may produce a desirable result of the function. Accordingly, input values 540A and 540B are recommended inputs.

Figure 2:
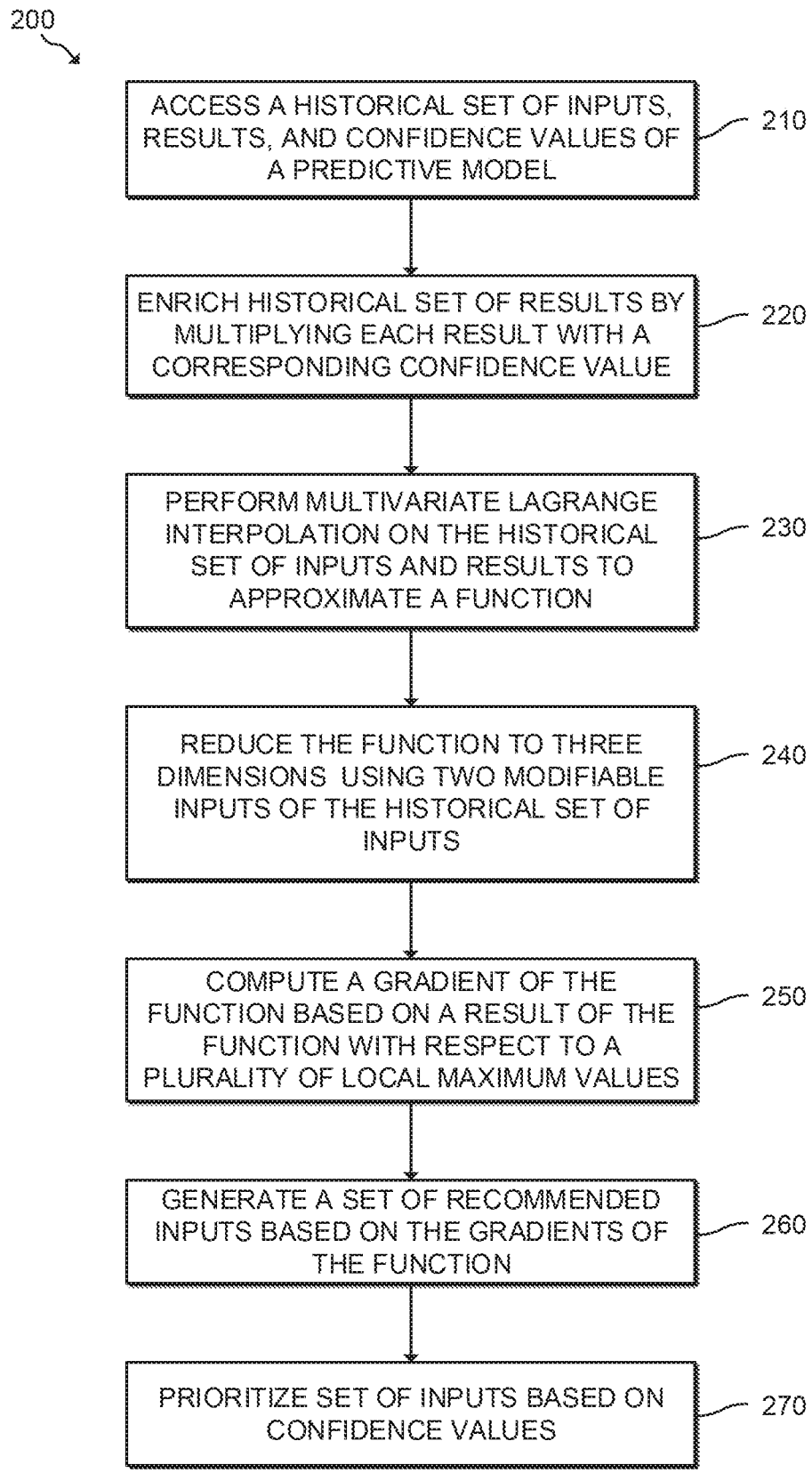
FIG. 2 is a flowchart of a second example method for generating recommended inputs.

FIG. 2 depicts a more detailed example method 200 for generating recommended inputs for changing an outcome of a predictive model. Method 200 may be implemented in the form of executable instructions stored on a machine-readable storage medium and/or in the form of electronic circuitry. For example, method 200 may be executed by a processor of a computing device, such as a computing device 300 or 400.

In an operation 110, a computing device may access a historical set of inputs, results, and confidence values of a predictive model from a database. For example, the input values may be variables and the result may be linked to the input values as a case in a set of labeled cases. The predictive model may be created by using the set of labeled cases, since each labeled case is a set of attributes and their corresponding results.

In some examples, the results of the predictive model may include the inputs corresponding to a positive or negative result. In other words, the results of the historical set may include a positive number, such as 1, and a negative number, such as −1, to represent a first or second result. Furthermore, in some examples, the historical set may also include a confidence value corresponding to each result of the predictive model. A corresponding confidence value may represent, for example, how many times a particular result occurs when the predictive model is applied to particular inputs. A confidence value may be represented by a percentage or decimal. For example, possible confidence values range from 0 to 1

In an operation 220, the computing device may enrich the historical set of inputs and results by multiplying the results with corresponding confidence values. Thus, the enriched results may be represented by positive or negative numbers calibrated by their corresponding confidence values. An example historical set of inputs, results, confidence values, and resulting enriched results is shown above in table 1.

In an operation 230, the computing device may perform Multivariate Lagrange Interpolation on the historical set of inputs and enriched results to approximate a function. The function may represent the historical set as a relation between the inputs or tuple of inputs and the results. For example a function F(inputs)=results. In some examples, a graph of the function may be generated for a lucid representation of the function. Furthermore, in some examples, other methods may be used to approximate the function.

As an illustration, FIG. 5 shows an example process 500 of approximating a function using a set of inputs and results of a predictive model. In the first step shown in FIG. 5, a historical set 510 of inputs and results, which may be enriched results, may be used to approximate a function 530.

In an operation 240, the computing device may reduce the function to three or fewer dimensions using modifiable inputs of the historical set of inputs. For example, the computing device may perform dimensionality reduction algorithms and methods to reduce the number of variables under consideration.

For example, function F as used above may be reduced to a two-variable function, where the two variables are two modifiable inputs labeled or determined as modifiable. Reducing the dimensionality of the function may allow the function to be comprehensibly represented by a two or three dimensional graph. For example, reducing a function to two dimensions—that is a function having one variable or input—allows the creating of a chart such as shown in FIG. 5.

In an operation 250, the computing device may compute a gradient of the function a result of the function with respect to a plurality of local maximum values of the function. While operation 130 will be described with reference to the example function 530 of FIG. 5, it should be understood that operation 130 is not limited to a two-dimensional graph of a function, but can be applied to any function produced in operation 120.

In the graph shown in FIG. 5, function 530 shows a graph having a local maximum 535A and a local maximum 535B. These local maxima points indicate peak enriched results values of the historical set 510. At a result 531 of the function, a gradient may be calculated with respect to local maximum 535A and with respect to local maximum 535B.

The gradients calculated in operation 250 may represent the slope of the tangent of the graph of the function. Specifically, the gradient may point in the direction of the greatest rate of increase of the function. Therefore, the gradient may indicate the direction of the local maximum value. Knowing the gradient may allow the discovery of positive results of the function in the directions of the local maximum values.

In an operation 260, the computing device may generate a set of recommended inputs based on the gradients of the function. Each recommended input, when used in the function, may produce a positive result of the function. In other words, replacing an original input of the predictive model with a corresponding recommended input may generate a positive result of the predictive model.

In some examples, the set of recommended inputs may be generated by finding input values in the function that may produce a positive result. In some examples, a positive result may be defined as a result that is equal to or higher than a threshold result value, as illustrated in FIG. 5.

In FIG. 5, recommended input values 540A and 540B may be identified by using the gradients of the function 530 at the result 531. For example, local maximum 535A and local maximum 535B may be used to identify input value 540A in the direction of local maximum 535A and input value 540B in the direction of local maximum 535, where both input value 540A and input value 540B would produce a result of the function equal to or greater than the threshold result value 545. Thus, input values 540A and 540B may both be added to the set of recommended inputs.

To determine the recommended inputs, the computing device may, in some examples, execute an iterative gradient ascent approach. Gradient ascent may be a first-order optimization algorithm that takes steps proportional to the positive of the gradient in order to approach a local maximum of the function. The gradient ascent approach may facilitate identification of the steepest ascent to the local maximum.

The gradient ascent approach may be particularly useful when the function is multi-variable. In such cases, the gradient ascent approach may allow the identification of the steepest ascent towards the local maximum at each iterative step of the process. Thus, the gradient ascent finds the fastest way for a result of the function to get to the threshold result value as described herein, which is to say the fastest way to get to a recommended input.

In an operation 270, the computing device may prioritize the set of recommended inputs based on the confidence values of the result of the predictive model for each recommended input value. The set of recommended inputs may include a plurality of inputs that produce a positive result of the function. The input values may be ranked, sorted, or otherwise distinguished by a corresponding confidence value of the result. In some examples, this may result in the input values being prioritized based on the magnitude of the result produced. Alternatively, in some examples, the set of recommended inputs may be prioritized by the relative magnitude of the local maximum based on which each recommended input was calculated. As described above, the magnitude of the enriched result of the function is related to both a positive and negative outcome of the predictive model and a confidence value of getting such a result.

FIG. 3 depicts an example computing device 300 for generating recommended inputs for changing an outcome of a predictive model. Computing device 300 may be, for example, a cloud server, a local area network server, a web server, a mainframe, a mobile computing device, a notebook or desktop computer, a point-of-sale device, a wearable device, any other suitable electronic device, or a combination of devices, such as ones connected by a cloud or internet network, that perform the functions described herein. In the example shown in FIG. 3, computing device 300 includes a processor 310 and a non-transitory machine-readable storage medium 320 encoded with instructions to generate recommended inputs.

Processor 310 may be one or more central processing units (CPUs), semiconductor-based microprocessors, and/or other hardware devices suitable for retrieval and execution of instructions stored in machine-readable storage medium 320. Processor 310 may fetch, decode, and execute instructions 321, 322, 323, 324, 325, and/or other instructions to implement the procedures described herein. As an alternative or in addition to retrieving and executing instructions, processor 310 may include one or more electronic circuits that include electronic components for performing the functionality of one or more of instructions 321, 322, 323, 324, and 325.

In one example, the program instructions 321, 322, 323, 324, 325, and/or other instructions can be part of an installation package that can be executed by processor 310 to implement the functionality described herein. In this case, memory 320 may be a portable medium such as a CD, DVD, or flash drive or a memory maintained by a computing device from which the installation package can be downloaded and installed. In another example, the program instructions may be part of an application or applications already installed on computing device 300.

Machine-readable storage medium 320 may be any electronic, magnetic, optical, or other physical storage device that contains or stores executable data accessible to computing device 300. Thus, machine-readable storage medium 320 may be, for example, a Random Access Memory (RAM), an Electrically Erasable Programmable Read-Only Memory (EEPROM), a storage device, an optical disc, and the like. Storage medium 320 may be a non-transitory storage medium, where the term "non-transitory" does not encompass transitory propagating signals. Storage medium 320 may be located in computing device 300 and/or in another device in communication with computing device 100. As described in detail below, machine-readable storage medium 320 may be encoded with access historical inputs, results, and confidence values instructions 321, enrich historical data instructions 322, approximate function instructions 323, compute gradient of function instructions 324, and generate set of recommended inputs instructions 325.

Access historical inputs, results, and confidence values instructions 321, when executed by processor 310, may access, from a database, a historical set of inputs, results, and confidence values of a predictive model. The functions of instructions 321 are described in further detail herein with relation to operations 110 and 210 in FIG. 1 and FIG. 2, respectively.

Enrich historical data instructions 322, when executed by processor 310, may enrich the historical set of results by multiplying each result with a corresponding confidence value. The functions of instructions 322 re described in further detail herein with relation to operations 220 in FIG. 2, respectively.

Approximate function instructions 323, when executed by processor 310, may approximate a function based on the historical set of inputs and enriched results. For example, processor 310 may perform Multivariate Lagrange interpolation. Furthermore, processor 310 may reduce the function to three or fewer dimensions using two modifiable inputs of the historical set of inputs. The functions of instructions 323 are described in further detail herein with relation to operations 120 in FIG. 1, and operations 230 and 240 in FIG. 2.

Compute gradient of function instructions 324, when executed by processor 310, may compute a gradient of the function based on a result of the function with respect to a local maximum value. Knowing the gradient may allow the discovery of positive results of the function in the direction of the local maximum value. The functions of instructions 324 are described in further detail herein with relation to operations 130 in FIG. 1, and operation 250 in FIG. 2.

Generate set of recommended inputs instructions 325, when executed by processor 310, may generate a set of recommended inputs based on the gradients of the function. Each recommended input, when used in the function, may produce a positive result of the function. In other words, replacing an original input of the predictive model with a corresponding recommended input may generate a positive result of the predictive model. The functions of instructions 325 are described in further detail herein with relation to operations 140 in FIG. 1, and operation 260 in FIG. 2.

Figure 4:
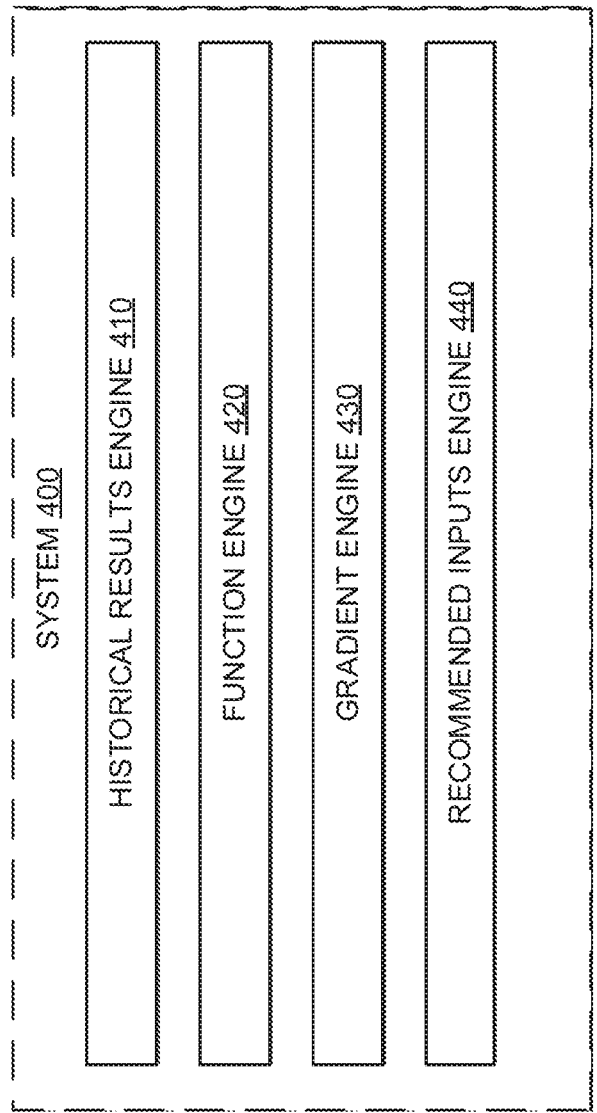
FIG. 4 is a block diagram of an example system having engines for generating recommended inputs for changing an outcome of a predictive model.

FIG. 4 depicts an example system 400 for generating recommended inputs for changing an outcome of a predictive model. System 400 may be, for example, a cloud server, a local area network server, a web server, a mainframe, a mobile computing device, a notebook or desktop computer, a point-of-sale device, a wearable device, any other suitable electronic device, or a combination of devices, such as ones connected by a cloud or internet network, that perform the functions described herein. The dotted line shows that the components of system 400 may be located together in a single device or that the components may be separate and functionally connected.

System 400 may include a series of engines 410-440 for generating the set of recommended inputs. Each of the engines may generally represent any combination of hardware and programming. For example, the programming for the engines may be processor executable instructions stored on a non-transitory machine-readable storage medium and the hardware for the engines may include at least one processor of the system 400 to execute those instructions. In addition or as an alternative, each engine may include one or more hardware devices including electronic circuitry for implementing the functionality described below.

Historical results engine 410 may access a historical set of inputs and results of a predictive model. In some examples, historical results engine engine 410 may perform functionality the same as or similar to instructions 321, when executed by processor 310 of computing device 300 in FIG. 3.

Function engine 420 may approximate a function based on the historical set of inputs and results. Function engine 420 may perform functionality the same as or similar to approximate function instructions 323, when executed by processor 310.

Gradient engine 430 may compute a gradient of the function based on a result of the function with respect to a local maximum value. Knowing the gradient may allow the discovery of positive results of the function in the direction of the local maximum value. Gradient engine 430 may perform functionality the same or similar to computing gradient of function instructions 324, when executed by processor 310.

Recommended inputs engine 440 may generate a set of recommended inputs based on the gradients of the function. Each recommended input, when used in the function, may produce a positive result of the function. In other words, replacing an original input of the predictive model with a corresponding recommended input may generate a positive result of the predictive model. Recommended inputs engine 440 may perform functionality the same or similar to instructions 325, when executed by processor 310.

System 200 may also include other components, such as a storage which may store the information and data associated with system 400. Such as storage may be any physical storage device or may be, for example, cloud-hosted storage.

The foregoing disclosure describes a number of example embodiments for generating recommended inputs for changing an outcome of a predictive model. The disclosed examples may include systems, devices, computer-readable storage media, and methods for generating recommended inputs. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

It should further be noted that, as used in this application and the appended claims, the singular forms "a," "an," and "the" include plural elements unless the context clearly dictates otherwise.

What is claimed is:

1. A method for execution by a computing device for generating recommended inputs, comprising:
   accessing, from a database, a historical set of inputs and results of a predictive model;
   approximating a function based on the historical set of inputs and results;
   computing a gradient of the function using a result of the function with respect to local maximum values of the function;
   generating a set of recommended inputs based on the gradient of the function,
   wherein using a recommended input in the function produces a positive result of the function; and
   generating a visualization of a graph of the function,
   wherein the visualization indicates the local maximum values of the function, the set of recommended inputs and the gradient provided between the local maximum values of the function,
   wherein the gradient represents a slope of a tangent of the graph of the function, and
   wherein the visualization includes a non-zero threshold result value intersecting the graph of the function and the recommended inputs have values greater than or equal to the non-zero threshold result value.

2. The method of claim 1, wherein the predictive model is created from a set of labeled cases, wherein each case comprises a set of attributes and corresponding results.

3. The method of claim 1, wherein the historical set of inputs and results comprises positive and negative values.

4. The method of claim 1, further comprising enriching the historical set of inputs and results by multiplying each result of the historical set of inputs and results with a corresponding confidence value.

5. The method of claim 4, wherein the set of recommended inputs is prioritized based on the corresponding confidence values of the result of the predictive model for each recommended input.

6. The method of claim 4, further comprising reducing the function to three dimensions using two modifiable inputs of the historical set of inputs.

7. The method of claim 6, wherein reducing the function to three dimensions includes utilizing feature selection methods or feature extraction methods.

8. The method of claim 1, further comprising performing Multivariate Lagrange interpolation on the historical set of inputs and results to approximate the function.

9. The method of claim 1, wherein gradient points of the gradient of the function are in a direction of a greatest rate of increase of the function.

10. The method of claim 1, wherein the gradient indicates a direction of each of the local maximum values of the function.

11. A non-transitory machine-readable storage medium encoded with instructions executable by a processor of a computing device, the non-transitory machine-readable storage medium comprising instructions to:
   access, from a database, a historical set of inputs and positive and negative results, and a corresponding confidence values for each result of a predictive model, wherein the predictive model is created from a set of labeled cases, and
   wherein each case comprises a set of attributes and corresponding results;
   enrich the historical set of inputs and positive and negative results by multiplying each result of the historical set of inputs and positive and negative results with the corresponding confidence value;
   approximate a function based on the enriched historical set of inputs and positive and negative results;
   compute a gradient of the function using a result of the function with respect to local maximum values of the function;
   generate a set of recommended inputs based on the gradient of the function,
   wherein using a recommended input in the function produces a positive result of the function, and
   generate a visualization of a graph of the function,
   wherein the visualization indicates the local maximum values of the function, the set of recommended inputs and the gradient provided between the local maximum values of the function,
   wherein the gradient represents a slope of a tangent of the graph of the function, and
   wherein the visualization includes a non-zero threshold result value intersecting the graph of the function and the recommended inputs have values greater than or equal to the non-zero threshold result value.

12. The non-transitory machine-readable storage medium of claim 11, further comprising instructions to reduce the function to three dimensions using two modifiable inputs of the historical set of inputs.

13. The non-transitory machine-readable storage medium of claim 12, wherein the instructions to reduce the function to three dimensions include utilizing feature selection methods or feature extraction methods.

14. The non-transitory machine-readable storage medium of claim 11, further comprising instructions to perform Multivariate Lagrange interpolation on the historical set of inputs and results to approximate the function.

15. The non-transitory machine-readable storage medium of claim 11, wherein gradient points of the gradient of the function are in a direction of a greatest rate of increase of the function.

16. A computing device for generating recommended inputs, the computing device comprising:
   a historical results engine to access, from a database, a historical set of inputs and positive and negative results, and a corresponding confidence value for each result of a predictive model and to enrich the historical inputs and positive and negative results by multiplying each historical positive and negative result with the corresponding confidence value;
   a function engine to perform Multivariate LaGrange interpolation on the historical set of inputs and positive and negative results to approximate a function;
   a gradient engine to compute a gradient of the function using a result of the function with respect to local maximum values of the function; and
   an input engine to generate a set of recommended inputs based on the gradient of the function,
   wherein using a recommended input value in the function produces a positive result of the function,
   wherein the gradient engine generates a visualization of a graph of the function, wherein the visualization indicates the local maximum values of the function, the set of recommended inputs and the gradient provided between the local maximum values of the function, wherein the gradient represents a slope of a tangent of the graph of the function, and wherein the visualization includes a non-zero threshold result value intersecting the graph of the function and the recommended inputs have values greater than or equal to the non-zero threshold result value.

17. The computing device of claim 16, wherein the function engine is to reduce the function to three dimensions using two modifiable inputs of the historical set of inputs.

18. The computing device of claim 17, wherein the function engine reduces the function to three dimensions utilizing feature selection methods or feature extraction methods.

19. The computing device of claim 16, wherein the set of recommended inputs is prioritized based on the corresponding confidence values of the result of the predictive model for each recommended input.

20. The computing device of claim 16, wherein gradient points of the gradient of the function are in a direction of a greatest rate of increase in the function.

* * * * *